United States Patent [19]

Gray

[11] Patent Number: 4,500,965
[45] Date of Patent: Feb. 19, 1985

[54] CAPSTANLESS MAGNETIC TAPE DRIVE WITH ELECTRONIC EQUIVALENT TO LENGTH OF TAPE

[75] Inventor: Martin D. Gray, La Jolla, Calif.

[73] Assignee: Cipher Data Products, Inc., San Diego, Calif.

[21] Appl. No.: 385,082

[22] Filed: Jun. 4, 1982

[51] Int. Cl.³ .............................................. G06F 3/00
[52] U.S. Cl. .................................. 364/400; 364/900; 360/55
[58] Field of Search ... 364/200 MS File, 900 MS File; 360/88, 62

[56] References Cited

U.S. PATENT DOCUMENTS

| | | | |
|---|---|---|---|
| 3,333,250 | 7/1967 | Hill et al. | 364/200 |
| 3,503,045 | 3/1970 | Wright | 364/200 |
| 3,772,657 | 11/1973 | Marsalka et al. | 364/200 |
| 3,774,156 | 11/1973 | Marsalka et al. | 364/200 |
| 3,942,190 | 3/1976 | Detwiler | 364/90 |
| 4,040,026 | 8/1977 | Gernelle | 364/200 |
| 4,392,200 | 7/1983 | Arulpragasam et al. | 364/200 |

*Primary Examiner*—Gareth D. Shaw
*Assistant Examiner*—Melinda B. Thaler
*Attorney, Agent, or Firm*—Baker, Maxham, Callan & Jester

[57] ABSTRACT

A magnetic tape drive capable of simulating the performance of a fast acceleration start/stop tape drive without a capstan drive or vacuum columns. A streaming type tape drive is provided with a semiconductor cache memory for storing data which may be written on, and data read from, a length of magnetic tape. Circuitry, including a microprocessor, DMA controller and service requests, handles data transfer between a host and the tape via the cache memory so that delays due to tape accelerations and decelerations are masked and the host can instantaneously read data bi-directionally and instantaneously switch between read and write operations.

8 Claims, 4 Drawing Figures

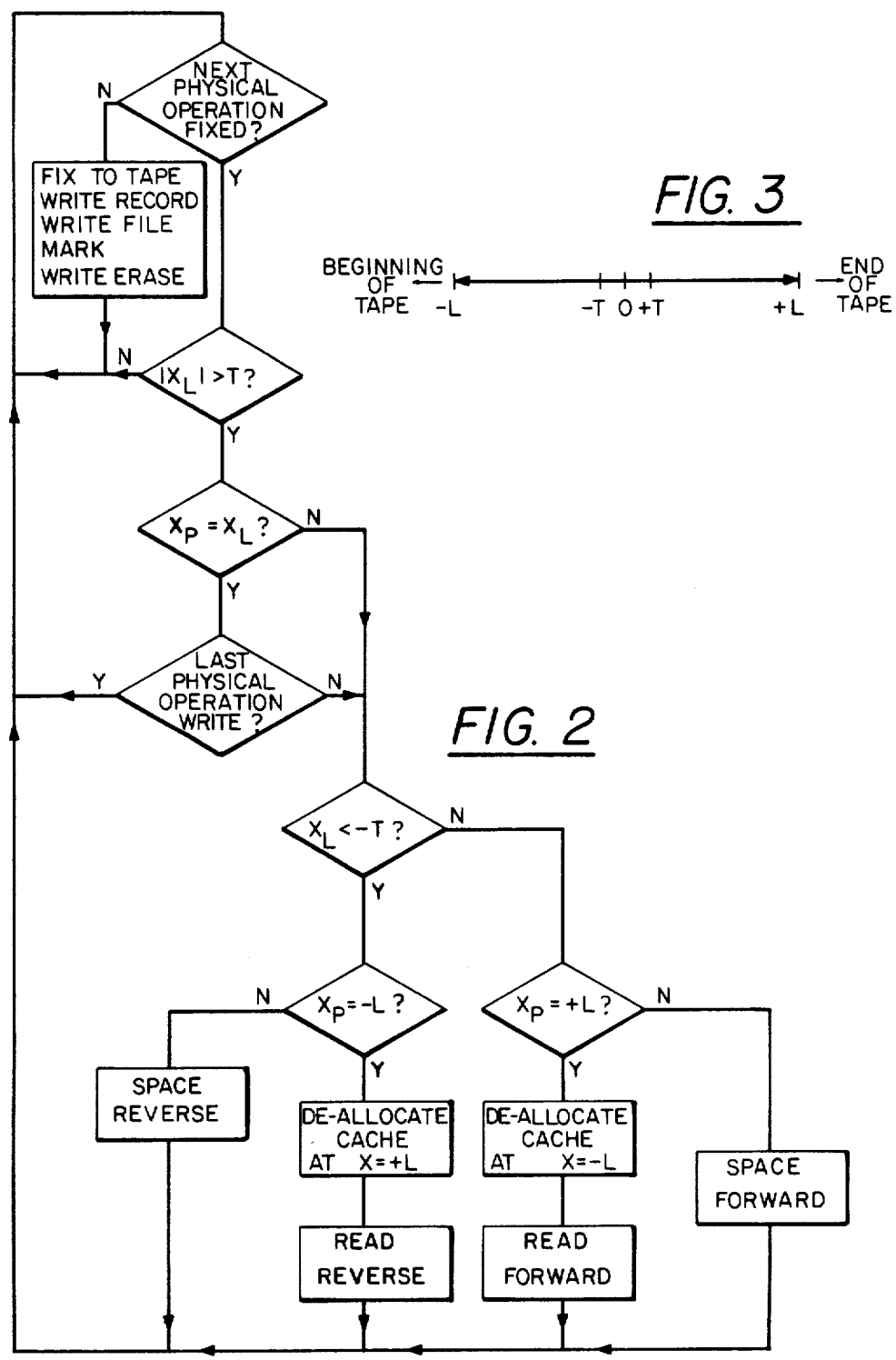

CAPSTANLESS MAGNETIC TAPE DRIVE WITH ELECTRONIC EQUIVALENT TO LENGTH OF TAPE

BACKGROUND OF THE INVENTION

The present invention relates to devices for storing data on magnetic tape, and more particularly, to a magnetic tape drive of the streaming type which electronically simulates conventional fast acceleration start/stop tape drives.

Conventional fast acceleration start/stop magnetic tape drives use high acceleration capstan motors to allow the tape to achieve the required operating speed within the minimum inter-record gap. Such motors must have a sophisticated low inertia construction to enable them to achieve high rates of acceleration. Therefore they are expensive and fragile. Typically, vacuum columns are employed as a mechanical buffer in such tape drives to decouple the high inertia load of the supply and take-up reels from the capstan drive.

The growing demand for backup of disk storage has led to the recent introduction of streaming tape drives, such as the F880 MICROSTREAMER (Trademark) tape drive manufactured by Cipher Data Products, Inc. and disclosed in U.S. Pat. No. 4,243,186. In a streaming tape drive, the tape runs more or less continuously, and the capability for fast acceleration is not provided. Therefore, the capstan drive mechanism and vacuum columns are eliminated. Furthermore, streaming tape drives utilize less expensive reel motors than fast acceleration start/stop tape drives. Accordingly, streaming tape drives are generally more reliable and less expensive than fast acceleration start/stop tape drives. While streaming tape drives perform well in a steady state environment involving long continuous write or read operations, they are not suited for applications which require frequent dynamic transtions such as read forward-to-read reverse, or applications requiring inter-record computer processing delays. Such delays can occur where the host computer is disposing of data just acquired from a previous record that has been read and is not in a position to recover further data. Conversely, such delays can also occur where the host computer has experienced delays in acquiring data from a source other than the tape drive and therefore cannot continue a tape write operation.

In the past, buffers have been used to equalize the transfer rates of interfaces such as the RS232C and IEEE488, with the data requirements of a synchronous fast acceleration start/stop tape drive. The aforementioned interfaces may be connected to a host such as a computer or a smart CRT. Such conventional buffers assemble an entire data record from the host before it is written onto tape, and read an entire record from the tape before it is transmitted to the host. In some cases, dual buffers have been utilized to permit one data record to be assembled in one of the buffers while a data record in the other buffer is being transferred.

If a conventional buffer were to be coupled between a host and a streaming tape drive, the buffer would accommodate the different data transfer rates in a steady state mode such as a continuous write operation. However, such a system would be unsatisfactory in an environment characterized by frequent dynamic transitions such as a read forward-to-read reverse operation. This is because a streaming tape drive is not capable of fast accelerations, and therefore rapid bi-directional tape access would not be possible.

SUMMARY OF THE INVENTION

It is thus the primary object of the present invention to provide a magnetic tape drive which can simulate the performance of a fast acceleration start/stop tape drive while eliminating the need for expensive capstan drives and vacuum columns.

It is another object of the present invention to provide a streaming tape drive in which delays due to accelerations and decelerations of the tape transport mechanism are masked electronically so that the host can instantaneously read data bi-directionally and instantaneously switch between read and write operations.

Accordingly, the present invention provides a magnetic tape drive capable of simulating the performance of a fast acceleration start/stop tape drive without a capstan drive or vacuum columns. A streaming type tape drive is provided with a semiconductor cache memory for storing data which may be written on, and data read from, a length of magnetic tape. Circuitry, including a microprocessor, DMA controller and service requests, handles data transfer between a host and the tape via the cache memory so that delays due to tape accelerations and decelerations are masked and the host can instantaneously read data bidirectionally, and instantaneously switch between read and write operations.

BRIEF DESCRIPTION OF THE DRAWINGS

FIG. 2 is a flow chart illustrating the operation of the physical tape transport portion of the preferred embodiment.

FIG. 3 is an illustration of an electronic equivalent to a length of magnetic tape which is utilized by the preferred embodiment.

DESCRIPTION OF THE PREFERRED EMBODIMENT

Figure 1:
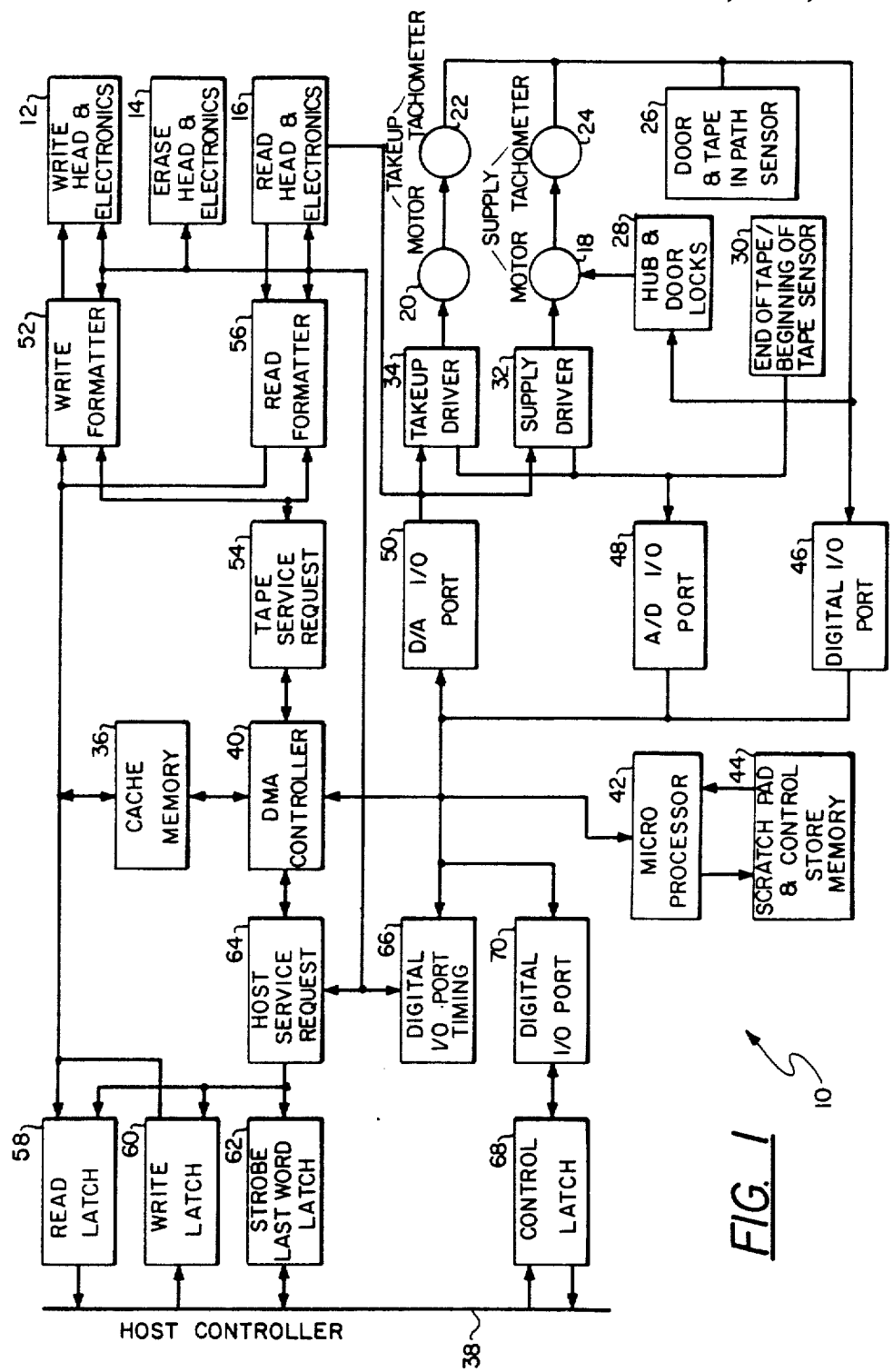
FIG. 1 is a functional block diagram of a preferred embodiment of the magnetic tape drive of the present invention.

Referring to FIG. 1, the preferred embodiment 10 of the magnetic tape drive of the present invention includes transducer means in the form of a write head 12, an erase head 14, and a read head 16 along with conventional electronic circuitry associated therewith. The heads 12, 14 and 16 may comprise a single assembly referred to herein as the physical head. This physical head is capable of writing data on a length of magnetic tape, reading data from the tape, and erasing data on the tape through the associated electronics.

The magnetic tape drive of FIG. 1 further includes means for selectively moving the tape forwardly and rearwardly past the physical head to permit write, read and erase operations. Preferably, the magnetic tape drive is of the streaming type, i.e., it does not incorporate any capstan drive or vacuum columns. Furthermore, it uses relatively slow acceleration supply and take-up motors 18 and 20, respectively. These motors rotate the supply and take-up reels.

By way of example, the motors 18 and 20 in the magnetic tape drive of the present invention need only accelerate the tape at three-hundred and fifty inches per second squared to yield an acceleration time of approximately two-hundred and fifty milli-seconds from zero to an operating speed of one-hundred inches per second. This is to be contrasted with a conventional fast acceleration start/stop tape drive which may require expensive low inertia capstan motors and vacuum columns to achieve accelerations of, for example, fifty thousand inches per second squared and acceleration times to operating speed of one milli-second.

In the preferred embodiment 10, the supply motor is operated as the driving element of a position servo mechanism (not illustrated) including a tension arm which serves to maintain the proper tape tension. The tension arm also limits the acceleration requirement of the supply motor, but only as an incidental function. An example of the foregoing servo arrangement may be found in the F880 MICROSTREAMER (Trademark) tape drive identified above.

The tape drive may be configured to accept open tape reels, cartridges, cassettes or other tape media containers. It may include various sensors for providing information to control circuitry hereafter described as to the status of various mechanical components. A tachometer 22 may be spring loaded against the tape pack on the take-up reel to provide speed control and tape position information. A tachometer 24 may provide information regarding the rotation of the supply reel during an automatic tape threading sequence. Door and tape in path sensors 26 may indicate whether a hinged door has been manually closed over a supply reel loading slot and whether the free end of the tape from the supply reel is between the supply reel and the physical head. Hub and door locks 28 secure the supply reel and lock the door in its closed position. End of tape and beginning of tape sensors 30 are also provided. The magnetic tape drive further includes supply and take-up driver circuitry 32 and 34. This circuitry includes power amplifiers for supplying current to the supply and take-up motors 18 and 20.

The magnetic tape drive of FIG. 1 has a cache memory 36 for storing data which may be written on, and data read from, a length of magnetic tape adjacent the physical head. Means are provided for masking delays due to accelerations and decelerations of the transport means so that a host controller 38 can instantaneously read data bi-directionally and instantaneously switch between read and write operations. Bi-directional refers to forward and reverse. Reading and writing is indirectly to and from the tape via the cache memory 36. Data from the host controller can be written into the cache memory instantaneously while the tape is accelerating up to operating speed. As soon as the tape reaches operating speed, data can be written onto the tape from the cache memory. Since data records are always read from tape in sequential fashion by the host controller, data can be read instantaneously from the cache memory while the tape catches up. Data can then be read from the tape and appended to that already in the cache memory so that the host controller does not experience any delays in reading data from the magnetic tape drive.

The cache memory 36 is preferably a semiconductor memory. Therefore, the time required for the host controller to access data from the cache memory is in the microsecond range, rather than in the milli-second range as would occur if the host controller were required to wait until the tape accelerated to full operating speed. As used herein, the terms instantaneous bi-directional read and instantaneous switching between read and write refer to that type of performance which can be provided by a conventional fast acceleration start/stop tape drive. Such a conventional drive is capable of accelerating to full operating speed within an industry standard minimum inter-record gap, for example 0.5 inches in PE type recording.

The cache memory 36 may comprise, for example, nine 64K RAMs. The cache memory is logically a circular buffer and is addressed by a four channel programmable direct memory access (DMA) controller 40. One suitable DMA controller is the 8237/8237-2 integrated circuit DMA controller manufactured by Intel Corporation.

A microprocessor 42 programs the DMA 40 and performs various other control functions. The microprocessor is preferably a Z8002 sixteen bit microprocessor manufactured by Zilog Corporation. The microprocessor 42 is preferably supported by 8K words of control store in EPROM and 2K words of scratch pad memory in RAM. The control store preferably comprises 64K bit EPROMs. The foregoing RAM and EPROM memory is illustrated in FIG. 1 by block 44.

The memory bus of the microprocessor is restricted to the control store EPROM and RAM. The I/O bus of the microprocessor communicates with the various status sensors of the physical tape transport means and with the driver circuits 32 and 34 through ports 46, 48 and 50. The I/O bus of the microprocessor also controls the cache memory 36 via the DMA controller 40.

A write formatter 52 is controlled by the microprocessor 42 which also effects the format delays. The write formatter requests data from the DMA controller 40 through a tape service request 54. The write formatter also performs phase and data transition encoding, file mark generation, ID burst generation, and preamble and postamble generation. The output of the write formatter is directed to the write head driver circuitry. This circuitry preferably includes eighteen saturated switches operating on the end taps of nine segments of the write head 12, each segment of which as a resistive current limited center tap. The center tap voltage is inhibited by a file protect sensor.

Nine read amplifiers in the electronics associated with the read head 16 recover the low voltage read signals from the tape, condition the signals to detect the voltage peaks, and frequency limit the signals to reject out of band noise. The read amplifiers also detect signal loss conditions to assist a read formatter 56 in block detection.

The front end of the read formatter 56 preferably comprises nine parallel digital phase discriminators which separate and detect the plurality of the data transitions from the possible phase transitions. The detected data transitions result in input requests to a serial processing skew buffer and postamble detection logic. Should a single dead track be detected, the read formatter replaces it with the parity track. When a full data character is assembled, a request is sent to the DMA controller 40 via the tape service request 54 to cause the data character to be placed in the cache memory 36. The postamble and dropout detection logic in the read formatter 56 provide interrupt requests to the microprocessor 42 which then controls tape motion accordingly. File mark patterns (both ANSI and IBM) and tape ID bursts are also sensed by this logic.

The host controller interface logic will now be described. A read latch 58, a write latch 60 and a strobe and last word latch 62 are connected to the DMA controller 40 and the cache memory 36 through a host service request 64. The rate of access is determined by pulses generated by a digital I/O port timing counter 66 programmed by the microprocessor 42 for the various burst transfer rates.

A control latch 68 is connected to the microprocessor through a digital I/O port 70 to enable commands from the host controller 38 to be decoded and status assembled. The GO, REW, and RWU tag lines are latched by discrete logic and the required status is immediately returned to the host controller. The latched tag lines in turn interrupt the microprocessor to force decoding of the accompanying command.

The magnetic tape drive of the present invention may be considered two tape transport mechanisms. One consists of a conventional streaming tape mechanism, referred to herein as the physical tape transport. The other consists of a logical transport which is simulated by a process executed under the control of the microprocessor. The physical tape transport and the logical tape transport are joined within the cache memory. On command from the microprocessor, the physical tape transport writes data records from the cache memory to the tape or reads data records from the tape into the cache memory. The physical tape transport attempts to maintain an image of the tape in the cache memory on each side of a logical recording head, which is a cache memory pointer stored in the RAM 44. The microprocessor handles re-instruct and re-positioning in the same way as a conventional streaming tape drive. The physical tape transport is capable of transferring data at a burst rate of, for example, one-hundred and sixty kilobytes per second regardless of the recording density. A recording scheme of sixteen hundred characters per inch may be read and written at a tape speed of approximately one-hundred inches per second. A recording scheme of approximately thirty-two hundred characters per inch may be read and written at a tape speed of approximately fifty inches per second.

The logical tape transport involves an interaction between the interface with the host controller and the microprocessor. A host controller tape motion command results in a write or read operation in the cache memory with the logical recording head moving accordingly. Access to the cache memory is unhindered by mechanical stop/start requirements of the physical tape transport means. Hence, it can be measured in microseconds rather than in milliseconds. Further, since access is to the cache memory rather than directly to the tape, the burst transfer rate can be different than that required by the physical tape transport.

As previously indicated, reading and writing is indirectly to and from the tape via the cache memory. Thus, several records to be written might reside in the cache memory and not on the tape. Standard error detection and correction techniques may be utilized. Errors encountered during a write operation result in the tape being automatically backspaced, erased, and re-written. Single track read errors are corrected "on the fly" and the magnetic tape drive automatically backspaces and re-tries multiple-track read errors. The operation program of the magnetic tape drive, which is stored in the EPROMs 44, assumes that all data following the current position on the tape can be overwritten when a write command is received other than a write edit command.

The operation of the physical tape transport portion of the magnetic tape drive of the present invention may now be better understood by way of reference to FIGS. 2 and 3. $X_L$ denotes the current position of the logical head, $X_P$ denotes the current position of the physical head, and T denotes the physical read motion threshold. The forward and rearward boundaries of the cache memory which, is equivalent to a predetermined length of magnetic tape, are denoted by $+L$ and $-L$. The actual boundaries of the cache memory may be larger than $+L$ and $-L$ in order to accommodate worst case record length.

Referring to FIG. 2, the physical tape transport initially determines whether the next physical operation has been fixed on tape. If not, the physical tape transport performs the next physical operation which is either a write record, write file mark, or write erase operation. If the next physical operation has already been fixed to tape, the next step is to determine if the absolute value of the current position of the logical head $(X_L)$ is greater than the physical read motion threshold (T). If not, this indicates that the current position of the logical head, which is a memory pointer, is roughly centered in the cache memory. This indicates that the physical tape transport does not yet need to move the tape forwardly or rearwardly past the physical head.

If the absolute value of the current position of the logical head $(X_L)$ is greater than the physical read motion threshold (T), the physical tape transport must then determine whether the current position of the physical head $(X_P)$ is equal to the current position of the logical head $(X_L)$. If these two positions are equal, and the last physical operation was a write operation, then the physical tape transport returns to the step of determining whether the next physical operation is fixed.

If the current position of the physical head $(X_P)$ does not equal the current position of the logical head $(X_L)$ or if $X_P$ equals $X_L$ and the last physical operation was not a write operation, then the physical tape transport determines whether the current position of the logical head $(X_L)$ is less than $-T$. In other words, the physical tape transport determines whether the current position of the pointer in the cache is to the left in FIG. 3. If so, then a determination is made if the current position of the physical head $(X_P)$ equals the left boundary $-L$ of the cache. If the current position of the physical head $(X_P)$ is at the left boundary of the cache memory in FIG. 3, a portion of the cache memory at the $+L$ side is de-allocated and is appended to the $-L$ side. The physical tape transport then reads reverse. The data read from tape is read into the newly appended portion of the cache. The physical tape transport then returns to the step of determining whether the next physical operation is fixed.

In the event that the current position of the logical head $(X_L)$ is less than $-T$ and the current position of the physical head $(X_P)$ does not equal $-L$, the physical tape transport then spaces or moves the magnetic tape in a reverse direction a predetermined amount. Data are not read from the tape to the cache memory since it already resides in the cache memory.

If the physical tape transport determines that the position of the logical head $(X_L)$ is not less than $-T$, it then determines whether the position of the physical head $(X_P)$ is equal to $+L$. In other words, the physical tape transport determines whether the current position of the physical head is at the right boundary of the cache memory. If $X_P$ equals $+L$, then the physical tape transport deallocates part of the cache memory at the −L end and appends it to the +L end. The physical tape transport then moves the tape forwardly and reads data therefrom into the appended portion of the cache memory. The physical tape transport is then ready to determine whether the next physical operation is fixed and so on.

If the physical tape transport, after determining that $X_L$ is not less than −T, determines that the position of the physical head $X_P$ is not equal to +L, it then spaces or moves the tape in a forward direction a predetermined amount to bring the location of the physical head toward the center of the cache memory. The physical tape transport can then return to the step of determining whether the next physical operation is fixed.

Figure 4:
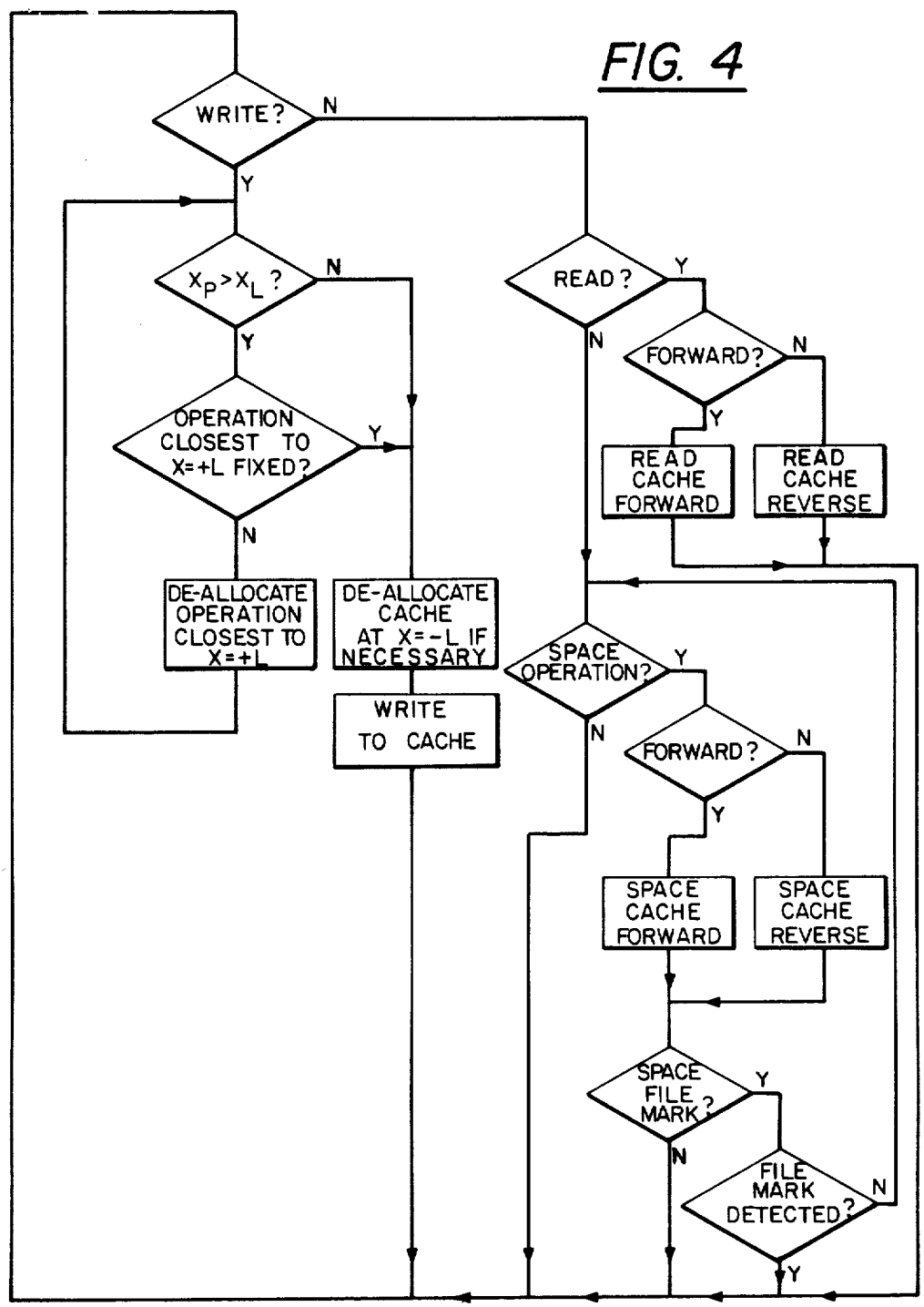
FIG. 4 is a flow chart illustrating the operation of the logical tape transport portion of the preferred embodiment.

FIG. 4 illustrates the operation of the logical tape transport portion of the magnetic tape drive of the present invention. This operation of the logical tape transport takes place simultaneously with the operation of the physical tape transport illustrated in FIG. 2. Referring to FIG. 4, the logical tape transport initially decides whether the operation to be performed is a write operation. If so, the logical tape transport determines whether the current location of the physical head ($X_P$) is greater than the current location of the logical head ($X_L$). In other words, a determination is made as to whether the physical head is forward of the pointer in the cache memory. If so, the logical tape transport must determine whether the operation closest to the forward boundary of the cache is fixed. If it is not fixed, then the operation in the cache memory closest to the forward boundary +L of the cache memory is de-allocated. This is because any data which has not yet been written which is forward of the current position of the logical head will be written over.

The logical tape transport again asks if the position of the physical head is forward of the position of the logical head. If so, another determination is made as to whether the operation closest to the forward boundary of the cache has been fixed. If not, the de-allocation of the operation closest to the forward boundary of the cache memory is repeated. This operation continues until either the position of the physical head is no longer forward of the logical head or the closest operation to the right hand boundary of the cache memory is fixed. The logical tape transport then de-allocates a portion of the cache memory at the rearward end (−L) if necessary and appends this portion to the forward end of the cache memory so that the entire record can be written into the forward end of the cache memory. The logical tape transport then returns back to the mode of determining the nature of the next operation to be performed.

In the event that the logical tape transport determines that the next operation is a read operation, it then determines whether the operation if a read forward or a read reverse. If it is a read forward operation, the logical tape transport reads forwardly through the cache memory. If it is a read reverse operation, the logical tape transport reads in a reverse direction through the cache memory.

In some cases, the logical tape transport will determine that an operation to be performed is not a write operation, and not a read operation. The logical tape transport must then determine whether the operation is a space operation. If so, it determines whether it is a space forward or a space reverse operation. If it is a space forward operation, the logical head is spaced forwardly through the cache memory. If the space operation is not a space forward operation, then the logical head is spaced rearwardly through the cache memory. In either case, the logical tape transport next determines whether there is a space file mark. If not, the logical tape transport returns to its mode of detecting the nature of the next operation to be performed. If there is a space file mark, then the logical tape transport determines whether a file mark has been detected. If so, the logical tape transport returns to its mode of determining the nature of the next operation. If no file mark is detected, then the logical tape transport returns to the step of determining whether there is a space operation.

Having described the operation of the physical tape transport and logical tape transport portions of the magnetic tape drive of the present invention, the manner in which they operate simultaneously will be further understood by way of the following example. Assume that the magnetic tape drive is in the middle of writing a data record with the logical head leading the physical head. The tape drive then receives a read reverse command from the host controller, while the data record has not yet been completely written on the tape from the cache memory. The logical tape transport instantaneously begins reading, from the cache memory, the end portion of the data record which has not yet been written on tape. Meanwhile, the physical tape transport continues writing the unwritten portion of the data record on the tape in the forward direction. So at this time, the logical tape transport is reading in the reverse direction through the cache memory while the physical tape transport is completing the writing of the data record on tape in the forward direction.

The physical tape transport finishes writing the data record before the logical tape transport has exhausted the portion of the data record which is in the cache memory. This is because the physical tape transport can read data at a faster rate than the host controller can receive from the cache memory. The physical tape transport next determines where the logical pointer in the cache memory is heading. The physical tape transport reverses the direction of the tape travel and begins moving the tape rearwardly until the physical head is located farther rearwardly into the data record than the logical head. The physical tape drive then begins reading from the tape into the cache memory so as to append the remaining portion of the data record into the cache memory. This appending may require that some of the cache memory at the forward end of the cache memory be de-allocated and re-allocated to the rearward end. When the logical head exhausts data that was in the cache memory when the reverse command was received, additional data has been read from the tape and appended to the cache memory. The logical tape transport continues reverse reading through the cache memory.

During the foregoing process it should be understood that the logical head and the physical head pass each other going in opposite directions, namely when the logical head is reading rearwardly through the cache memory and the physical head is writing forwardly. Thereafter, the physical head reverses direction, catches up to, and passes the logical head.

Write errors that may occur when the physical tape transport is writing the last portion of the data record may require that the logical head be held up. This in turn may require that the host controller be held up until the physical head can catch up allowing logical head cache memory allocation. Due to the relative infrequency of write errors, such delays are normally insubstantial over an entire tape recorded in PE.

Having described a preferred embodiment of the magnetic tape drive, it should be apparent to those skilled in the art that my invention may be modified in both arrangement and detail. Therefore, the protection afforded my invention should be limited only in accordance with the scope of the following claims.

I claim:

1. A magnetic tape drive operative with a host controller for reading and writing sequential data records comprising:

transducer means for writing the data records on magnetic tape and for reading the data records therefrom;

means for selectively moving the tape in forward and rearward directions past the transducer means;

means for sensing a position of the transducer means on the tape;

a cache memory for storing the data records to be written on, and the data records read from, the tape, a data storage capacity of the cache memory corresponding to a predetermined length of the tape and having forward and rearward boundaries; and circuitry means connected to the transducer means, tape moving means, transducer position sensing means and cache memory for generating a logical head that moves forwardly and rearwardly through the cache memory as the data records are written into and read therefrom, for controlling the tape moving means to cause a corresponding position of the transducer means to approach a position of the logical head during a write operation, and for causing the position of the logical head to approach the corresponding position of the transducer means during a read operation so that delays due to accelerations and decelerations of the tape moving means are masked and the host controller can instantaneously read data bi-directionally and instantaneously switch between read and write operations.

2. A magnetic tape drive according to claim 1 wherein the cache memory is logically configured in a circular buffer form.

3. A magnetic tape drive according to claim 1 wherein the cache memory is a semiconductor memory.

4. A magnetic tape drive according to claim 1 wherein the circuitry means includes:

a microprocessor; and a programmable direct memory access controller operatively coupled between the microprocessor and the cache memory.

5. A magnetic tape drive according to claim 4 wherein the circuitry means further comprises:

a host controller service request coupled between the host and the direct memory access controller; and a tape service request coupled between the transducer means and the direct memory access controller.

6. A magnetic tape drive according to claim 1 wherein the circuitry means includes means for permitting simultaneous transfer of data between the cache memory and the host controller and between the cache memory and the tape.

7. A magnetic tape drive according to claim 1 wherein the data storage capacity of the cache memory is large enough to accommodate worst case record length.

8. A magnetic tape drive operative with a host controller for reading and writing data records comprising:

a streaming type tape transport including a transducer and means for sensing a position of the transducer on a length of tape carried by the transport;

cache memory means for temporarily storing data records to be written on, and read from, the tape, a data storage capacity of the cache memory means corresponding to a predetermined length of the tape;

means for generating a logical head that moves through the cache memory means as the data records are written into and read therefrom; and control means for causing the logical head to move toward a center of the cache memory means during a read operation and for causing the transducer position to move toward a corresponding location in the center of the cache memory means during a write operation.

* * * * *